US009873267B2

(12) United States Patent
Rae et al.

(10) Patent No.: US 9,873,267 B2
(45) Date of Patent: Jan. 23, 2018

(54) PRINT CURING APPARATUS

(71) Applicant: GEW (EC) Limited, Crawley (GB)

(72) Inventors: Malcolm Rae, Crawley (GB); James Hicks, Crawley (GB)

(73) Assignee: GEW (EC) Limited, Crawley (GB)

( * ) Notice: Subject to any disclaimer, the term of this patent is extended or adjusted under 35 U.S.C. 154(b) by 0 days.

(21) Appl. No.: 14/994,488

(22) Filed: Jan. 13, 2016

(65) Prior Publication Data

US 2016/0200119 A1 Jul. 14, 2016

(30) Foreign Application Priority Data

Jan. 13, 2015 (GB) .................................. 1500494.8

(51) Int. Cl.

| | |
|---|---|
| ***G01J 1/42*** | (2006.01) |
| ***B41J 11/02*** | (2006.01) |
| ***B41F 23/04*** | (2006.01) |
| ***B41J 11/00*** | (2006.01) |

(52) U.S. Cl.

CPC ........... *B41J 11/02* (2013.01); *B41F 23/0406* (2013.01); *B41F 23/0409* (2013.01); *B41F 23/0453* (2013.01); *B41J 11/002* (2013.01)

(58) Field of Classification Search

CPC ...... G01J 1/429; G01J 1/58; G01J 1/02; G01J 1/04; G01N 21/33

See application file for complete search history.

(56) References Cited

U.S. PATENT DOCUMENTS

| | | | | |
|---|---|---|---|---|
| 2012/0133716 A1 | | 5/2012 | Aizawa et al. | |
| 2012/0261595 A1 | | 10/2012 | Inui et al. | |
| 2013/0228707 A1 | * | 9/2013 | Nieminen | G02B 6/0008 250/492.1 |
| 2013/0286060 A1 | * | 10/2013 | Duffield | B41J 29/38 347/5 |
| 2014/0138550 A1 | | 5/2014 | Yang et al. | |
| 2014/0265869 A1 | * | 9/2014 | Takemoto | H05B 41/39 315/151 |
| 2014/0292970 A1 | * | 10/2014 | Rae | B41F 23/04 347/102 |
| 2015/0307721 A1 | * | 10/2015 | Seo | C09D 183/04 428/212 |

FOREIGN PATENT DOCUMENTS

| | | |
|---|---|---|
| GB | 2242259 A | 9/1991 |
| GB | 2448538 A | 10/2008 |
| WO | 2013/021184 A1 | 2/2013 |

OTHER PUBLICATIONS

UKIPO Search Report, Application No. GB1500494.8, dated Mar. 25, 2015, pp. 1-4.

* cited by examiner

*Primary Examiner* — David Porta
*Assistant Examiner* — Mamadou Faye
(74) *Attorney, Agent, or Firm* — Nelson Mullins Riley & Scarborough LLP; Anthony A. Laurentano

(57) ABSTRACT

A print curing apparatus comprising a housing (1) for receiving a radiation source; a controller for controlling the power supplied to the radiation source (7, 7'); a detector for detecting the type of radiation source (7, 7') and for feeding a signal to the controller in order to alter the power supplied accordingly.

10 Claims, 5 Drawing Sheets

PRINT CURING APPARATUS

RELATED APPLICATIONS

This application claims priority to United Kingdom Patent Application No. 1500494.8, filed on Jan. 13, 2015. The entire contents of the foregoing application is incorporated herein by reference.

FIELD OF THE INVENTION

The present invention relates to a print curing apparatus having an improved lamp head arrangement and a control system therefor.

BACKGROUND OF THE INVENTION

Print curing apparatus, comprising a housing containing an ultraviolet (UV) source arranged to direct UV radiation onto a substrate, to cure ink are well-known. Traditionally UV curing apparatus comprise a UV lamp, such as a mercury arc UV lamp, which produces UV radiation by generating an electric arc inside an ionized gas chamber. Recent improvements in UV curing technology have included the use of light emitting diodes (LEDs) to emit radiation in the UV spectrum. The use of LED technology in print curing offers improvements in energy efficiency, such that LED print curing technology is more environmentally friendly. The energy efficiency of LED print curing apparatus is also further improved because the burden of cooling the apparatus is reduced. It is also possible to print on a greater variety of materials using LED technology and have better control of the desired geometry of the print curing area.

However, there are perceived disadvantages for users considering installing LED print curing apparatus. The capital investment in replacing UV arc systems with LED apparatus is in addition to the increased cost of spare parts. The cost and complexity in replacing arc lamp devices with LED devices is exacerbated by the different power requirements between the two UV sources. Traditional arc lamp print curing arrays require an AC power source and a high voltage ignition. The high voltage ignition is required to ignite the arc after which discharge can be maintained at a lower voltage. LED print curing arrays require a DC power source without requiring a high voltage ignition. The applicant has identified that each technology is better suited to different print applications; both in terms of the ink to be cured and the market for the printed end result.

SUMMARY OF THE INVENTION

The present invention sets out to provide an improved print curing apparatus, which alleviates the problems described above to provide a much improved print curing apparatus.

In one aspect, the present invention provides a print curing apparatus comprising:

- a housing for receiving a radiation source;
- a controller for controlling the power supplied to the radiation source;
- a detector for detecting the type of radiation source and for feeding a signal to the controller in order to alter the power supplied accordingly.

Preferably, the radiation source is provided within a carrier; more preferably, the carrier is a cassette; and preferably, the cassette is slideable into the housing.

Preferably, the radiation source is any one of an ultra violet (UV) radiation source; an infra-red (IR) radiation source; or a LED radiation source.

Preferably, the print curing apparatus further comprises a power supply.

More preferably, the cassette contains a mercury arc UV radiation source or a LED UV radiation source.

Preferably, the invention provides at least two interchangeable cassettes, wherein the first cassette contains a mercury arc radiation source and the second cassette contains a LED radiation source The present invention offers a hybrid print curing apparatus offering the option to choose the source of UV and/or IR radiation; that is, to select whether to use a traditional mercury arc lamp radiation source or a LED radiation source. The present invention allows a user to upgrade to a LED print curing apparatus without risking any of the associated disadvantages in having to use alternative inks or increasing the cost of replacement parts. The hybrid system of the present invention allows a user to select between two or more alternative radiation sources to select the most appropriate radiation type for the ink to be cured; the substrate on which the ink is cured; and the printing application.

Preferably, the print curing apparatus further comprises a safety switch or a safety interlock.

The present invention allows for the automatic detection of the radiation source and also prevents power being supplied to the device if a cassette, i.e. a radiation source, is not inserted.

The present invention also enables the radiation source to be changed without any requirement to change the plug or power supply to the print curing apparatus.

Preferably, the controller is configured to control whether a DC or AC power supply is input to the print curing apparatus.

The present invention is able to meet the different power requirements of a mercury arc radiation source; an infra red radiation source; and a LED radiation source.

Preferably, the controller is configured to control a supply voltage to the cassette in the range of about 0 to about 450V and/or control the supply of an additional ignition voltage to the cassette of about 4 kV to about 5 kV for an additional ignition. Optionally, the controller is configured to supply voltage to the cassette in the range of about 0V to about 1350V.

The present invention is configured to supply the correct voltage for an arc lamp (UV or IR) where an ignition high voltage is required and also adapt to supply the correct voltage for a LED lamp head, for which a temporary high voltage ignition ‘spike’ is not required and which, if supplied, would destroy the LEDs.

Preferably, the print curing apparatus further comprises a microchip device; preferably, a data storage device.

Preferably, the microchip or data storage device is configured to store any one or more of the following:

i) a lamp head unique identifier;

ii) lamp head data.

Preferably, lamp head data includes any one or more of the following: type of lamp head; length of lamp head; maximum running parameters of the lamp head; wiring configuration of the lamp head; cooling requirements of the lamps; history of use of the lamp head, for example, the number of hours that the lamp head has previously been used for print curing.

Preferably, the controller of the print curing apparatus is for controlling the power supplied to the radiation source and/or for controlling one or more shutters and/or for controlling one or more cooling components of the print curing apparatus.

Preferably, the cooling components of the print curing apparatus comprise an air-cooled system and/or a water-cooled system; preferably comprising one or more fans and/or one or more chillers and/or one or more manifolds.

The microchip/data storage device allows for much improved efficiency because input required from the installer/operated is minimised, which also minimises the risk of errors. The data storage device ensures that the correct cooling is configured for the type of lamp head that is inserted into the apparatus. The data storage device also ensures that the correct current can be automatically determined, without further input being required from the installer/user. The data storage device allows the ink curing apparatus to automatically re-configure not only for the type of lamp head that is inserted, but also any peripheral requirements to maximise efficiency and safety. The improved ink curing apparatus avoids the degradation of performance when the lamp head has been run beyond the recommended number of hours. The system recommends, at the appropriate time, that the lamp head be replaced before performance starts to degrade.

In a further aspect, the present invention provides a print curing method comprising the following steps:

i) inserting a radiation source into a housing of a print curing apparatus wherein the housing allows for insertion of alternative radiation sources;
ii) detecting the type of radiation source;
iii) controlling the power supply to the radiation source according to the type of radiation source detected.

Preferably, the print curing apparatus is a print curing apparatus as described herein.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Within this specification, the term “about” means plus or minus 20%, more preferably plus or minus 10%, even more preferably plus or minus 5%, most preferably plus or minus 2%.

BRIEF DESCRIPTION OF THE DRAWINGS

The invention will now be described by way of example with reference to the accompanying diagrammatic drawings, in which.

DETAILED DESCRIPTION

Figure 1:
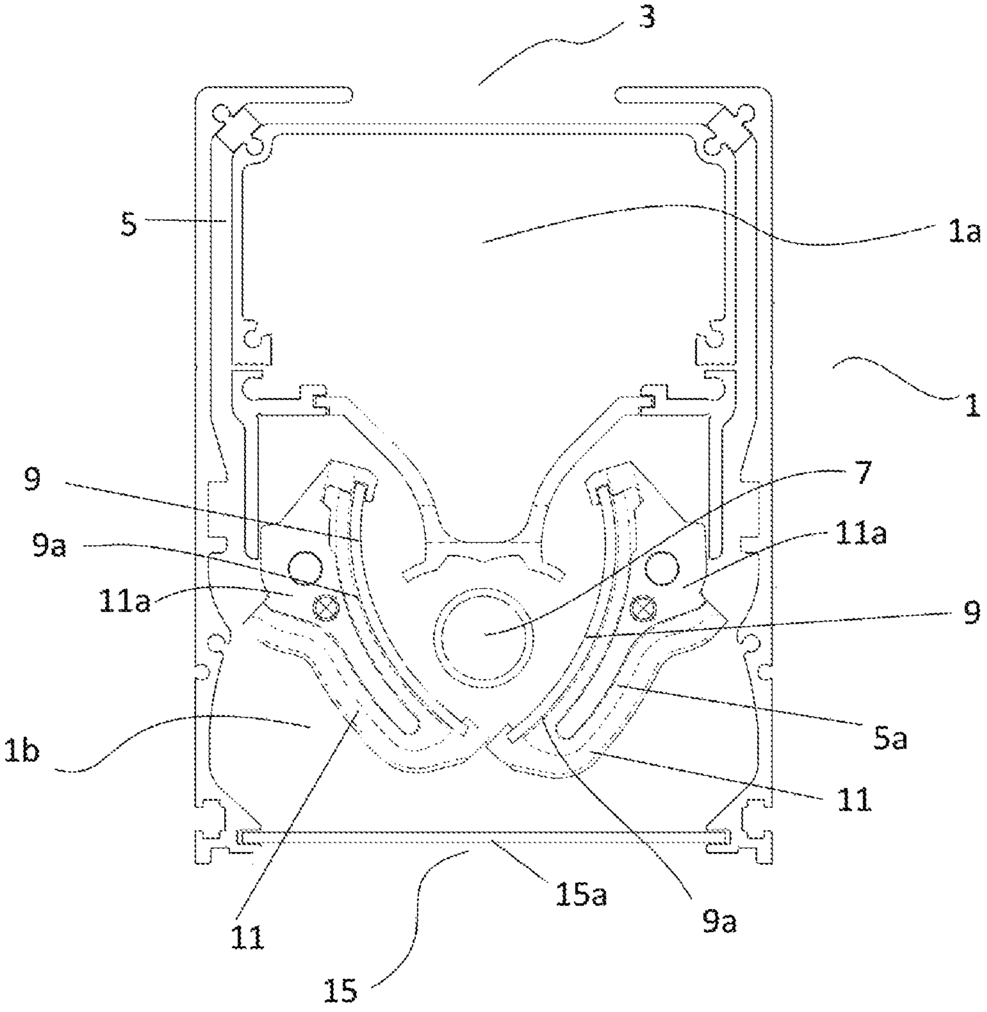
FIG. 1 is a cross-sectional view through a print curing apparatus constructed in accordance with the present invention with a mercury arc lamp head cassette installed therein, showing a non-operative position.

Referring to FIG. 1, the print curing apparatus comprises a housing 1 with an upper chamber is and a lower chamber 1*b*. The upper chamber is houses a fan (not shown) to draw air into the housing 1 through an inlet 3. In alternative embodiments, the apparatus 1 comprises a duct to blow air into the system or makes use of a water-cooling system. The cooling system of the apparatus is connected to an external heat exchanger (not shown). An air passage 5 extends around the inner face of the housing 1.

Figure 2:
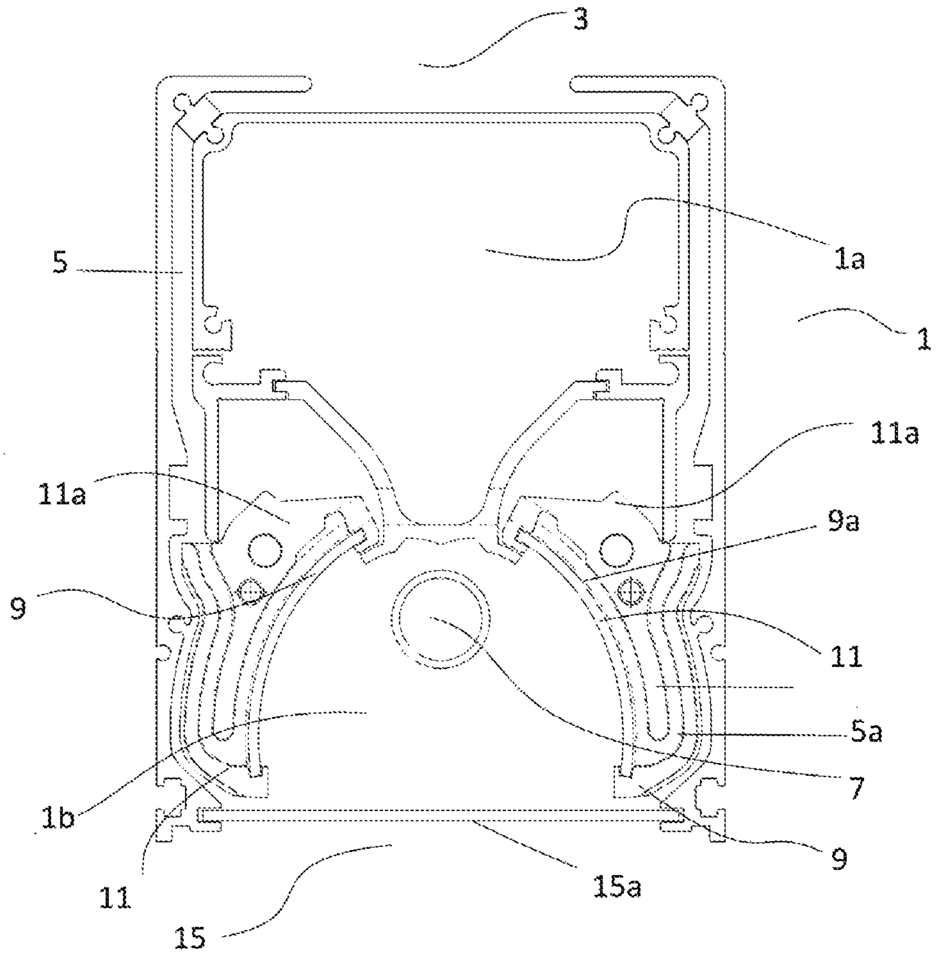
FIG. 2 is a cross-sectional view through the print curing apparatus of FIG. 1 in an operative position.

The lower chamber 1*b* of the housing 1 houses a cassette containing a mercury-based arc UV lamp 7 surrounded by two reflectors 9. Each reflector 9 is held in place by an extruded shutter 11, which is hinged and is moveable between an open position exposing the lamp 7, which is shown in FIG. 2 and a closed position concealing the lamp 7, which is shown in FIG. 1. In alternative embodiments of the present invention the apparatus comprises two reflectors and a further, separate shutter member or shutter members.

The shutter 11 is extruded from aluminium and comprises a hinged member 11*a* running substantially along the length of the rear face 9*a* of the reflector 9. It is to be understood that the rear face 9*a* of the reflector is the face that is furthest from and not directly exposed to the mercury arc lamp 7. The curved shape and positioning of the reflector/shutter arrangement 9, 11 with respect to the lower chamber 1*b* ensures that the air flow passage 5, 5*a* is unobstructed for cooling regardless of whether the shutters 11 are in the open or closed position.

As shown in FIGS. 1 and 2, the mercury-based arc UV lamp 7 is housed in a cassette which carries the arc UV lamp 7; the reflectors 9 and the shutter member 11. The arc UV cassette is interchangeable and slideable in to and out of the print curing apparatus housing 1. The housing 1 comprises a quick-release mechanism allowing the UV cassette to be easily and conveniently removed from the print curing apparatus 1. The print curing apparatus further comprises a hex key or other such safety locking mechanism.

Figure 4:
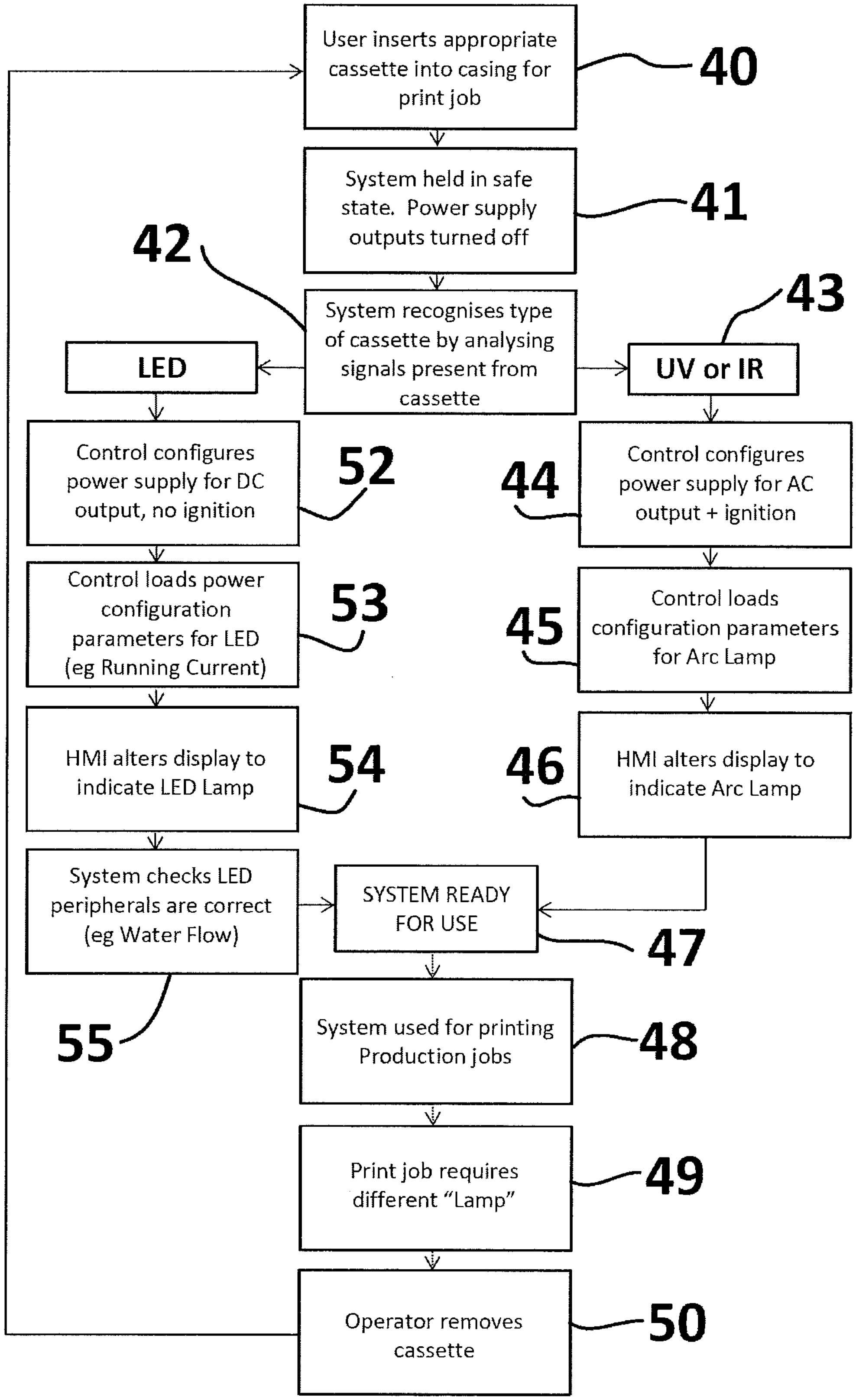
FIG. 4 is a flow chart schematically illustrating the control system of a first embodiment of the present invention.

Referring to FIG. 4, in use, a UV cassette is inserted (step 40) into the print curing apparatus when the system is held in a “safe state”, whereby the power supply to the apparatus is switched off (step 41). A detector detects that a cassette has been inserted to unlock the safety interlock and allow connection of the cassette housing 1 to the print curing apparatus. The print curing apparatus recognises (step 42) the type of cassette that has been inserted by analysis of specific features of the cassette together with the signals that are emitted by the cassette. Each lamp head has a selection of low voltage (24V) control signals and these signals include the chassis link; the LED link and other signals, including the “over temperature switch” and the temperature sensor, which is for example a “PT100 temperature sensor”, which is a platinum resistance transducer. The apparatus detects whether a chassis link is present. A chassis link is an electrical wire, which is a feature of a UV or LED lamp. The apparatus also detects whether a LED link is present. A LED link is a pin or similar component on the front panel of a LED cassette. An example of the signal analysis carried out (step 42) by the present invention is set out in Table 1:

TABLE 1

| Detection State | Chassis Link Detected? | LED link detected? | Other signals present? | Lamp Type input to control system |
|---|---|---|---|---|
| 1 | Yes | No | Yes | Ultra Violet (UV) arc |
| 2 | No | No | Yes | Infra-Red (IR) arc |
| 3 | Yes | Yes | Yes | LED |
| 4 | Irrelevant | Irrelevant | No | No lamp present |

The type of cassette that is recognised; that is, whether the cassette is a LED cassette (step 51), or a UV or IR cassette (step 43); is input to a control system. The control system of the present invention then configures a group of appropriate pre-determined power settings for the inserted cassette (step 44, 52), which are fed back as output parameters, which are loaded to a controller to control the power supply (not shown) (steps 45, 53).

A human-machine interface (HMI) also displays to a user the type of lamp cassette that has been detected; e.g. indicating for a first detection state that a UV or IR arc lamp has been detected (step 46); and for a second detection state 3 that a LED lamp has been detected (step 54); and for a further detection state that no lamp is present. For a LED lamp head, the system will also check that any required peripheral requirements are met (step 55); for example, whether required water flow for cooling is present. In an alternative embodiment of the present invention, as described with respect to FIG. 5, the system checks peripheral requirements for both LED and arc lamp heads.

Referring to FIG. 4, the system is then ready for use (step 47) and carries out printing production (step 48) until an alternative radiation source is required (step 49). The operator then removes the cassette (step 50) and a safety interlock is activated until a user inserts a cassette (step 40) for the above-described method to be repeated.

For a mercury arc UV print curing apparatus, as shown in FIGS. 1 and 2, an alternating (AC) high voltage ignition is provided to the arc lamp 7. An additional ignition voltage of about 4 kV to 5 kV is supplied for an ignition period of, for example, about 20 μsec, which is allowed to heat up before the system is used for printing. The ignition voltage and the length of the ignition period can be varied according to system requirements. After successful ignition, a pre-determined current is applied to lamp, whilst it warms up. When the lamp has warmed, the lamp is ready to use for print curing. The current changes according to system requirements. For example, a UV arc lamp having a length of 35 cm requires a maximum current of about 12 A.

Referring to FIGS. 2 and 4, following connection to the power supply the print curing apparatus is moved into an operative position. The shutters 11 are opened to direct UV radiation through a curing aperture 15, which is defined between the two shutters 11 and protected by a quartz window **15*a*. The arc lamp 7 emits UV radiation, which is reflected from the lamp-facing surfaces of the reflectors 9 and is directed through the quartz window 15*a*** onto a substrate (not shown) beneath the apparatus.

Figure 3:
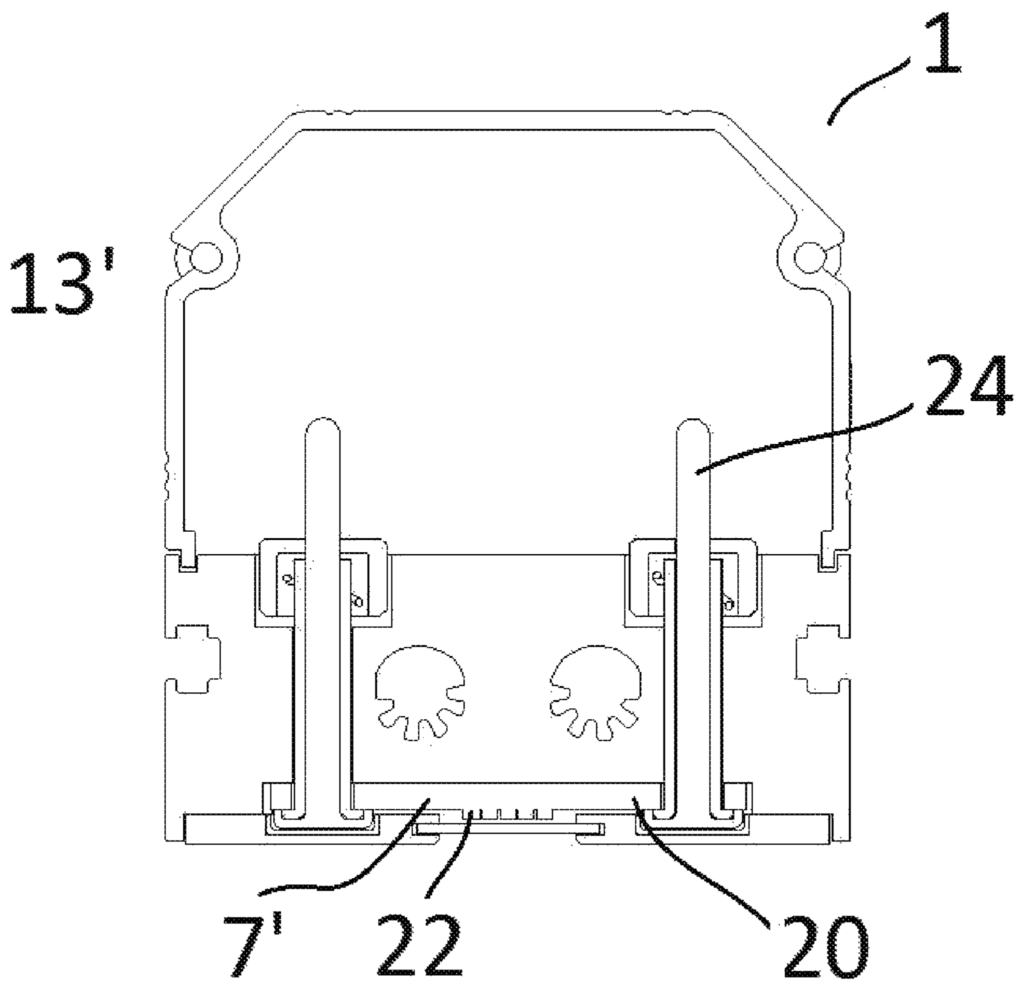
FIG. 3 is a cross-sectional view of the print curing apparatus of FIG. 1, showing a LED lamp head cassette installed therein.

Referring to FIG. 3, the hybrid print curing apparatus of the present invention also comprises an interchangeable LED UV cassette having an alternative LED radiation source 7'. The LED UV cassette comprises multiple LED modules 20 and each LED module 20 comprises a plurality of LEDs 22. The LED modules 20 are mounted within the LED UV cassette using pins 24 such that they are individually replaceable. In alternative embodiments the LED modules are mounted using clips or other similar holders that allow the modules to be individually replaced.

The LED UV cassette has an identical casing shape and configuration to the arc UV cassette, previously described with reference to FIGS. 1 and 2. The interconnections between the LED UV cassette and the apparatus are identical to the interconnections between the arc cassette and the apparatus. Thus, to change the radiation source there is no requirement to change the power supply or interconnecting means/plug between the print curing apparatus and the power supply. The arc and the LED cassettes are slideable into and out of the print curing apparatus 1. As previously described, housing 1 of the print curing apparatus comprises a quick-release mechanism allowing the LED UV cassette to be easily and conveniently removed from the print curing apparatus. The print curing apparatus further comprises a hex key or other such safety locking mechanism.

Referring to FIG. 4, as previously described with respect to the use of an arc UV cassette, in use, the LED UV cassette is inserted into the print curing apparatus (step 40) when the system is held in a "safe state" (step 41). A detector detects that a cassette has been inserted to unlock the safety interlock and allow connection of the housing 1 to a power supply (not shown). The print curing apparatus recognises that a LED source has been inserted by analysing the signals emitted from the cassette (step 42), and inputs this to the control system (step 51). The control system then configures a group of appropriate pre-determined power settings for the inserted LED UV cassette (step 52) which are fed back as output parameters, which are loaded to a controller to control the power supply (not shown) (step 53). The control system also configures the configuration parameters for a LED cassette, which are loaded by the system (step 53). For a LED UV print curing cassette, as shown in FIG. 3, a direct (DC) power supply is provided to the LED modules 20, without any requirement for a high voltage ignition. A human-machine interface (HMI) displays to a user that a LED cassette has been detected (step 54) and the system checks that LED peripheral requirements are correct (step 55); for example whether water flow is established.

For a LED lamp of 35 cm length a maximum current of 10 A is required. The maximum current varies according to system requirements and will either be pre-set value or value input to the system via the lamp head. It is also envisaged that, on detection of a LED cassette, the apparatus loads a configuration including any required peripheral settings; for example, for a LED apparatus a chiller interlock will be enabled to allow for appropriate cooling of the apparatus.

Following detection of the insertion of a UV cassette the control system identifies whether the cassette is a mercury arc UV or IR cassette; or a LED UV cassette. The control system then outputs a set of pre-determined power supply settings configured according to the UV cassette that has been detected. As referred to previously, for a mercury arc UV cassette the power supply settings would be a high voltage, AC power; for a LED UV cassette the power supply settings would be a DC power without a high voltage ignition requirement.

Figure 5:
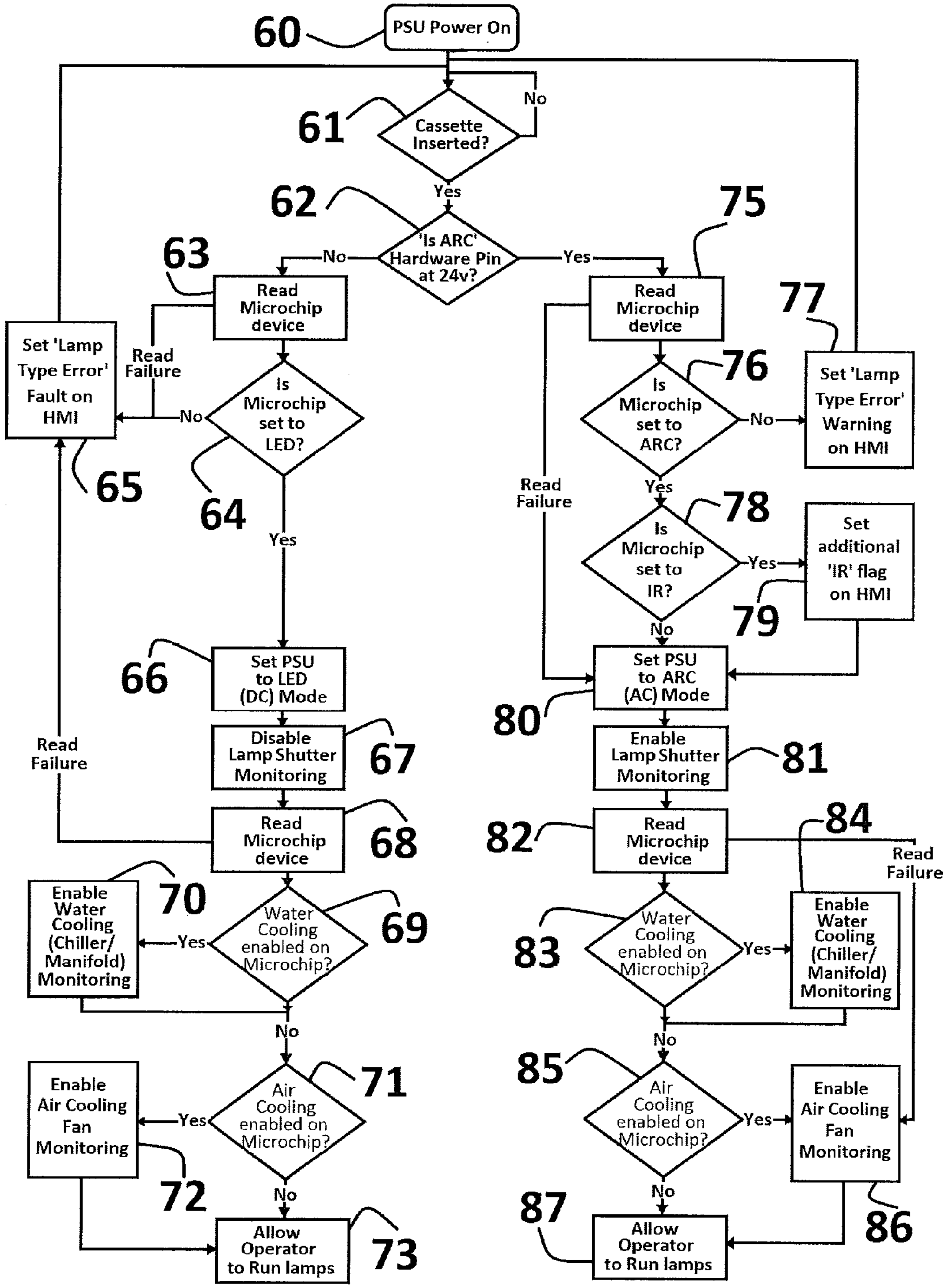
FIG. 5 is a flow chart schematically illustrating the control system of a second embodiment of the present invention.

With reference to FIG. 5, in a second embodiment of the present invention the ink curing apparatus comprises further features allowing detection of peripheral requirements associated with the detected radiation source. For example, in the second embodiment of the present invention the apparatus detects whether it is necessary to provide water cooling or air cooling and also whether flow monitoring of the cooling system is required. For example, if the radiation source is a mercury arc lamp, air cooling using fans may be required. Alternatively, if the radiation source is one or more LEDs, water cooling may be required together with appropriate flow monitoring; lamp heads having an LED radiation source may also require a combination or air and water cooling. The ink curing apparatus of the present invention feeds a signal to the controller to alter the power supply according to the radiation source detected and also to adapt peripheral cooling and monitoring requirements according to the radiation source that is detected.

Referring to FIG. 5, when the power supply unit is switched on (step 60), the ink curing apparatus comprises a detector that detects a cassette has been inserted (step 61). The apparatus then detects (step 62) whether a mercury arc lamp pin is at 24V. As previously described with respect to Table 1, if a lamp pin is not detected (step 62), the system deduces that a LED cassette is likely to be present and therefore proceeds to read (step 63) a microchip on the circuit board of the inserted lamp head. The microchip connects to a communications bus through the lamp cable to the apparatus power supply. The microchip used in the second embodiment of the ink curing apparatus comprises any one or more, or all of the following:

i) a unique serial number/unique identifier that is uniquely assigned to the lamp head; for example "LW1". This information allows the system to track the lamp head; for example for each lamp head to which a unique identified is assigned, usage and/or lamp head location are recorded;

ii) data recording, for example, the type and/or the length and/or the wavelength of the lamp head;

iii) for LED radiation sources, details of the wiring configuration of the lamp head so that maximum running current can be automatically determined. The automatic calculation of running current and other required settings eliminates the need for input from the installer or user of the ink curing apparatus. This improves the accuracy of print curing and eliminates any risk of human error;

iv) the absolute maximum safe running parameters of the lamp head. This improves both the safety and performance of the ink curing apparatus because it avoids the risk that the lamp head can be used when the radiation source is exceeding safe parameters; for example when the lamp head is running at a higher temperature than that which is safe or efficient. For example, it is possible for a LED cassette to be moved to a different ink curing apparatus having different settings. Without the storage of the maximum safe running parameters of the lamp head it is possible that a user will mistakenly try to run a LED lamp head above its maximum parameters, which risks destroying the lamp head. The microchip embodiment of the present invention eliminates this risk;

v) memory recording data in respect of the lamp head; for example, the number of hours the radiation source has been running. The microchip embodiment of the present invention provides a permanent link between each individual cassette and data recording its use.

As shown in FIG. 5, following successful reading of the microchip (step 63) the apparatus asks whether the microchip is set to LED (step 64) and if not, an error fault is detected (step 65). If the data stored on the microchip cannot be retrieved then the power supply unit will not run the lamp to protect the lamp from possible damage. If the microchip is detected to be set to LED (step 64) then the power supply unit (PSU) is set to LED mode; i.e., as previously described, to DC power (step 66). In LED mode, the apparatus disables monitoring of the lamp shutter (step 67), because no shutter is present in an LED lamp head, and reads the above-referenced information i)-v) from the microchip device (step 68). The apparatus detects whether water cooling is indicated to be enabled (step 69) and, if required activates the necessary water cooling and monitoring of cooling by control of a chiller and/or manifold components of the apparatus (step 70). If reading of the microchip indicates that water cooling is not enabled for the LED radiation source, the apparatus continues to ask whether air cooling is enabled (step 71) and, if air cooling is required, the apparatus proceeds to enable air cooling via the fan/s of the apparatus (step 72). In a further embodiment, not shown in FIG. 5, an LED radiation source is enabled for both air and water cooling, which will be indicated to the system on reading of the microchip. Only when all the necessary information has been received from the microchip device is the operator permitted to run the LED radiation source and the ink curing apparatus (step 73).

Following insertion of a UV or IR mercury arc lamp cassette (at steps 61 and 62), the system will detect that an arc lamp hardware pin is present, as referred to in Table 1. The system then proceeds (step 75) to read the microchip device and confirm that the microchip is set to arc lamp settings (step 76). If (step 75) it is not possible to read the microchip device, a message is output indicating "read failure". If (at step 62) an arc pin has been detected and the system proceeds to fail to read a microchip device, the system will proceed to assume that no microchip is present and use locally stored settings to allow the lamp to run. This ensures that the apparatus is compatible with existing arc lamp heads. If the system does not detect (step 76) that the microchip is set to indicate insertion of an arc cassette (step 77), a message indicating "lamp type error" is output to the user interface (HMI). Following confirmation that the microchip is set to arc (step 76), then the system detects whether the microchip is set to infra-red (IR) (step 78) and, if the system indicates that the lamp type is infra-red (IR), a further message is output to the user via the HMI to flag that the lamp type is IR (step 79).

If the system detects that the lamp type is an arc lamp (UV or IR) then the power supply unit is set to arc mode (step 80) so that an alternating current (AC) is supplied, as previously described. The system also enables the required lamp shutter monitoring (step 81) before reading further data from the microchip device (step 82). When in arc mode, if the microchip cannot be read (step 82), the system configures to default to air-cooling mode to maintain the systems compatibility with existing lamp heads; that is, so that the system can still be used with existing lamp heads without the microchip. If the microchip device can be read (step 82) then the system asks whether water cooling is enabled for the cassette, according to the data stored on the microchip (step 83) and, if so, the system enables monitoring of water cooling; for example, by monitoring components such as the chiller and/or the manifold (step 84). The system then proceeds to ask whether, as an alternative, or in addition to water cooling, air cooling is enabled according to the data stored on the microchip (step 85). If air cooling is enabled, the system proceeds to enable monitoring of the air cooling; for example, monitoring the output of a fan/s (step 86). When data regarding the cooling requirements of the lamp head has been extracted from the microchip, the system allows the operator to run the lamp (step 87).

When the ink curing apparatus is running, data is also collected from the system and stored on the microchip; for example, the number of hours that the radiation source has been running is collected and stored. The apparatus also detects whether the radiation source is running according to safe running parameters, which are stored on the microchip. If the safe running parameters of the radiation source are exceeded then the power supply unit will be switched off; for example, to avoid the apparatus exceeding maximum temperatures.

The above described embodiment has been given by way of example only, and the skilled reader will naturally appreciate that many variations could be made thereto without departing from the scope of the claims.

The invention claimed is:

1. A print curing apparatus, comprising:

a housing for receiving a radiation source;

at least first and second interchangeable cassettes, wherein the first cassette includes a mercury arc radiation source and the second cassette includes a LED radiation source;

a single power supply operable in an ARC mode to supply AC power and in an LED mode to supply DC power;

a controller for controlling the power supplied to the radiation source by the power supply based on the type of cassette, and a detector for detecting the type of radiation source by detecting the type of cassette that is inserted and for feeding a signal to the controller in order to alter the power supplied accordingly;

wherein the power supply is operated in the ARC mode by the controller when the first cassette having the mercury arc radiation source is detected by the detector and is operated in the LED mode by the controller when the second cassette having the LED radiation source is detected by the detector.

2. A print curing apparatus according to claim 1, wherein the cassette is slideable into the housing.

3. A print curing apparatus according to claim 1, wherein the radiation source is any one of an ultra violet (UV) radiation source; an infra-red (IR) radiation source; or a LED radiation source.

4. A print curing apparatus according to claim 1, further comprising a power supply.

5. A print curing apparatus according to claim 1, further comprising a safety switch or a safety interlock.

6. A print curing apparatus according to claim 1, wherein the controller is configured to control a supply voltage in the range 0 to 450V, and/or to control the supply of an additional ignition voltage of 4 kV to 5 kV.

7. A print curing apparatus according to claim 1, further comprising a microchip device.

8. A print curing apparatus according to claim 7, wherein the microchip device is configured to store a lamp head unique identifier or a lamp head data.

9. A print curing apparatus according to claim 7, wherein the controller is configured to control the power supplied to the radiation source and/or to control one or more shutters and/or to control one or more cooling components of the print curing apparatus.

10. A print curing method, comprising the steps of i) inserting a radiation source into a housing of a print curing apparatus wherein the housing allows for insertion of alternative radiation sources from at least first and second interchangeable cassettes, wherein the first cassette includes a mercury arc radiation source and the second cassette includes a LED radiation source;

ii) detecting the type of radiation source by detecting the type of cassette that is inserted; and iii) controlling the power supply to the radiation source by a single power supply operable in an ARC mode to supply AC power and in an LED mode to supply DC power based on the type of cassette, wherein the power supply is operated in the ARC mode when the first cassette having the mercury arc radiation source is detected by the detector and is operated in the LED mode when the second cassette having the LED radiation source is detected by the detector.

* * * * *